US009742736B2

(12) United States Patent
Conus et al.

(10) Patent No.: US 9,742,736 B2
(45) Date of Patent: Aug. 22, 2017

(54) ETHERNET DECODER DEVICE AND METHOD TO ACCESS PROTECTED CONTENT

(75) Inventors: Joel Conus, Essertines-sur-Yverdon (CH); Christophe Nicolas, Saint-Prex (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/112,450

(22) PCT Filed: Apr. 19, 2012

(86) PCT No.: PCT/IB2012/051968
§ 371 (c)(1),
(2), (4) Date: Oct. 17, 2013

(87) PCT Pub. No.: WO2012/143880
PCT Pub. Date: Oct. 26, 2012

(65) Prior Publication Data
US 2014/0040623 A1 Feb. 6, 2014

Related U.S. Application Data

(60) Provisional application No. 61/476,774, filed on Apr. 19, 2011.

(51) Int. Cl.
H04L 9/32 (2006.01)
H04N 7/16 (2011.01)
(Continued)

(52) U.S. Cl.
CPC ....... *H04L 63/0428* (2013.01); *H04N 21/222* (2013.01); *H04N 21/2347* (2013.01);
(Continued)

(58) Field of Classification Search
CPC .......... H04L 63/0823; H04L 9/3236
(Continued)

(56) References Cited

U.S. PATENT DOCUMENTS 6,298,088 B1 10/2001 Bhatt et al.
6,724,914 B2 4/2004 Brundage et al.
(Continued)

FOREIGN PATENT DOCUMENTS

CA 2681128 9/2008
CN 1290441 4/1941
(Continued)

OTHER PUBLICATIONS

European Search Report issued in EP 13 17 5253 dated Apr. 1, 2014.
(Continued)

*Primary Examiner* — Fatoumata Traore
(74) *Attorney, Agent, or Firm* — DLA Piper LLP US

(57) ABSTRACT

The present invention aims to address the issue of deploying costly hardware by proposing a content protection layer with an easy distribution capability to clients. The aim is achieved by an network device for descrambling an access controlled audio/video content stream, said network device being configured to be connected to a network router comprises a memory to store a unique address UA specific to the network device, an network input/output interface, a descrambler to descramble the audio/video content stream, and a watermark engine configured to watermark the descrambled audio/video content stream by applying the unique address. A further object of the invention is a method to access scrambled audio/video content stream in a local or roaming mode by a multimedia reception device connected via an IP network to a network router having an IP port connected to the network device.

12 Claims, 2 Drawing Sheets

(51) Int. Cl.
*H04L 29/06* (2006.01)
*H04N 21/222* (2011.01)
*H04N 21/2347* (2011.01)
*H04N 21/418* (2011.01)
*H04N 21/647* (2011.01)
*H04N 21/8358* (2011.01)
*H04N 21/226* (2011.01)
*H04N 21/61* (2011.01)

(52) U.S. Cl.
CPC ... *H04N 21/4181* (2013.01); *H04N 21/64784* (2013.01); *H04N 21/8358* (2013.01); *H04N 21/2265* (2013.01); *H04N 21/6125* (2013.01); *H04N 21/6175* (2013.01)

(58) Field of Classification Search
USPC .................................................. 713/176, 186
See application file for complete search history.

(56) References Cited

U.S. PATENT DOCUMENTS

| | | |
|---|---|---|
| 7,406,598 B2 | 7/2008 | Ducharme |
| 7,613,691 B2 | 11/2009 | Finch |
| 7,653,940 B2 | 1/2010 | Luo et al. |
| 7,694,318 B2 | 4/2010 | Konig et al. |
| 7,698,350 B2 * | 4/2010 | Kii .................... G06F 17/30053 707/822 |
| 7,738,704 B2 | 6/2010 | Lienhart et al. |
| 7,970,164 B2 | 6/2011 | Nakamura et al. |
| 7,984,089 B2 * | 7/2011 | Gates .................. G06F 17/3002 707/793 |
| 8,086,171 B2 | 12/2011 | Wang et al. |
| 8,126,202 B2 | 2/2012 | Nakamura et al. |
| 8,166,302 B1 * | 4/2012 | Shih .............................. 713/176 |
| 8,395,822 B2 | 3/2013 | Guo et al. |
| 8,667,552 B2 * | 3/2014 | Subramanian ..... H04N 21/4331 725/118 |
| 2002/0007403 A1 | 1/2002 | Echizen |
| 2002/0172395 A1 | 11/2002 | Foote et al. |
| 2003/0072467 A1 | 4/2003 | Brundage et al. |
| 2003/0163684 A1 | 8/2003 | Fransdonk |
| 2003/0185417 A1 | 10/2003 | Alattar |
| 2005/0015816 A1 | 1/2005 | Christofalo et al. |
| 2005/0036653 A1 | 2/2005 | Brundage et al. |
| 2005/0044561 A1 | 2/2005 | McDonald |
| 2005/0102236 A1 | 5/2005 | Wary |
| 2005/0149968 A1 | 7/2005 | Konig et al. |
| 2005/0262352 A1 * | 11/2005 | Kessler et al. ................ 713/176 |
| 2006/0048237 A1 | 3/2006 | Luo et al. |
| 2006/0120562 A1 * | 6/2006 | Fudge ..................... G06T 1/005 382/100 |
| 2006/0187358 A1 | 8/2006 | Lienhart et al. |
| 2006/0190776 A1 | 8/2006 | Oostveen et al. |
| 2006/0253330 A1 | 11/2006 | Maggio et al. |
| 2006/0257000 A1 | 11/2006 | Boyce et al. |
| 2006/0282847 A1 | 12/2006 | Gupte |
| 2007/0286454 A1 | 12/2007 | Brundage et al. |
| 2008/0010653 A1 | 1/2008 | Ollikainen et al. |
| 2008/0089552 A1 | 4/2008 | Nakamura et al. |
| 2008/0098464 A1 | 4/2008 | Mizrah |
| 2008/0168489 A1 | 7/2008 | Schraga |
| 2009/0216872 A1 | 8/2009 | Albig et al. |
| 2009/0217049 A1 | 8/2009 | Seehaweru |
| 2009/0323822 A1 | 12/2009 | Rodriguez et al. |
| 2010/0034389 A1 | 2/2010 | Sakharov |
| 2010/0046606 A1 | 2/2010 | Celik et al. |
| 2010/0115616 A1 | 5/2010 | Jogand-Coulomb |
| 2010/0172539 A1 | 7/2010 | Sugimoto |
| 2010/0195488 A1 | 8/2010 | Mehrotra |
| 2010/0251352 A1 | 9/2010 | Zarchy |
| 2010/0269128 A1 | 10/2010 | Gordon |
| 2010/0290667 A1 | 11/2010 | Lienhart et al. |
| 2011/0058188 A1 | 3/2011 | Guo et al. |
| 2011/0069861 A1 | 3/2011 | Brundage et al. |
| 2011/0149145 A1 | 6/2011 | Ramos et al. |
| 2011/0228972 A1 | 9/2011 | Nakamura et al. |
| 2011/0255840 A1 | 10/2011 | Bornsen |
| 2011/0268428 A1 | 11/2011 | Chen |
| 2012/0016876 A1 | 1/2012 | Oostveen et al. |
| 2012/0045054 A1 | 2/2012 | Main et al. |
| 2012/0063636 A1 | 3/2012 | Lienhart et al. |
| 2013/0276033 A1 | 10/2013 | Francini et al. |
| 2014/0032918 A1 | 1/2014 | Wendling |
| 2014/0040623 A1 | 2/2014 | Conus et al. |
| 2014/0068260 A1 * | 3/2014 | Oney et al. ................... 713/168 |
| 2014/0115626 A1 | 4/2014 | Sarda et al. |

FOREIGN PATENT DOCUMENTS

| | | | | |
|---|---|---|---|---|
| CN | 1694528 | | 11/2005 | |
| CN | 1741442 | | 3/2006 | |
| DE | 10 2004 056336 | | 5/2006 | |
| EP | 1009126 | | 6/2000 | |
| EP | 2 270 742 | | 1/2011 | |
| FR | 2 858 733 | | 2/2005 | |
| NL | EP 1009126 A1 * | 6/2000 | ......... H04N 1/32144 |
| TW | 201110701 | | 3/2011 | |
| TW | 201203188 | | 1/2012 | |
| WO | WO 00/35144 | | 6/2000 | |
| WO | WO 01/28230 | | 4/2001 | |
| WO | WO 03/063445 | | 7/2003 | |
| WO | WO 2004/040913 | | 5/2004 | |
| WO | WO 2007/065719 | | 6/2007 | |
| WO | WO 2007/090795 | | 8/2007 | |
| WO | WO 2009/032214 | | 3/2009 | |
| WO | WO 2010/051436 | | 5/2010 | |
| WO | WO 2011/032167 | | 3/2011 | |

OTHER PUBLICATIONS

European Search Report issued in EP 11 174431. dated Apr. 25, 2013.
M.D. Walker et al., "Mobile Video-Streaming", BT Technology Journal, vol. 21, No. 3, pp. 192-202, Jul. 2003.
Amos Fiat et al., "Dynamic Traitor Tracing", J. Cryptology, vol. 14, pp. 211-223 (2001).
English language abstract of FR 2 858 733, published Feb. 11, 2005.
English language abstract of DE 10 2004 056336, published May 24, 2006.
International Search Report issued in International Application No. PCT/IB2012/051968, dated Aug. 2, 2012.
Written Opinion issued in International Application No. PCT/IB2012/051968, dated Aug. 2, 2012.
Chi-Hung Chi et al., "Automatic Proxy-Based Watermakring for WWW", Computer Communications, vol. 24, No. 2, pp. 144-154, Feb. 1, 2001.
Search Report issued in EP 12 18 5786, dated Feb. 8, 2013.
Partial European Search Report issued in EP 12 17 7576 dated Dec. 21, 2012.
P.Y. Liew et al., "Inaudible Watermakring Via Phase Manipulation of Random Frequencies", Multimed Tools Appl., vol. 35, pp. 357-377 (2007).
Anand S. Nair et al., "Length Based Network Steganography Using UDP Protocol", IEEE Thrid International Confernece on Communication Software and Networks, pp. 726-730, May 27, 2011.
Mohamed F. Mansour et al., "Audio Watermarking by Time-Scale Modification", 2001 IEEE International Conference on Acoustics, Speech, and Signal Processing, pp. 1353-1356. May 7, 2001.
U.S. Appl. No. 14/942,727, filed Nov. 16, 2015, Pending.
Search Report issued in Taiwanses Application No. 102125937 dated Jun. 22, 2016.
English language abstract of TW 20111701 published Mar. 16, 2011.
English language abstract of TW 201203188 published Jan. 16, 2012.
Chinese Office Action issued in CN 201280019398.2 dated Aug. 10, 2016, with English language Translation.
English language abstract of CN 1694528A dated Nov. 9, 2005.

(56) References Cited

OTHER PUBLICATIONS

English language abstract of CN 1741442A dated Mar. 1, 2006.
English language abstract of CN 1290441A dated Apr. 4, 2001.
Image File History of U.S. Appl. No. 13/187,194.
Image File History of U.S. Appl. No. 13/948,527.
Image File History of U.S. Appl. No. 14/036,678.
Image File History of U.S. Appl. No. 14/942,727.

* cited by examiner

ETHERNET DECODER DEVICE AND METHOD TO ACCESS PROTECTED CONTENT

CROSS REFERENCE TO RELATED APPLICATIONS

This application is a U.S. National Stage Application of International Application No. PCT/IB2012/051968 filed Apr. 19, 2012, which claims priority from U.S. Provisional Patent Application No. 61/476,774 filed Apr. 19, 2011.

FIELD OF THE INVENTION

The present invention concerns the field of multimedia reception devices, in particular devices based on Ethernet communication layer for IP protocol and a method to access protected content by a multimedia reception device.

BACKGROUND ART

The IP protocol is today widely used to distribute multimedia contents such as audio, video. Huge database are accessible on-line and allow to stream live or on-demand content. These contents are streamed using Internet communication protocol, in unicast or multicast mode.

In order to develop rapidly this offer, the providers are using widely accepted standard and rely on a software based security to protect their contents. Even if they accept a limited security level, they want to avoid the deployment of particular and expensive hardware such as set-top-boxes and/or CAM (Conditional Access Module) devices.

Document U.S. Pat. No. 7,406,598 related to a method and system for secure content distribution discloses a system on a chip (SOC) device comprising external outputs, and external inputs. A first secure storage location is operably decoupled from all of the external outputs of the SOC device during a normal mode of operation. By being decoupled from all external outputs, representations of the data stored at the first secure device are prevented from being provided to the external outputs. A decryption engine is also included on the system on a chip, comprising a first data input, and a private key input coupled to a first portion of the first secure storage location, and an output coupled to a second secure location. The decryption engine is operable to determine decrypted data from data received at the first data input based upon a private key received at the private key input. The decryption engine is further operable to write the decrypted data only to the first secure memory location and the second secure location. The system further comprises a descrambler having an output coupled to a watermark module operable to provide a watermark to image data from the output of the descrambler.

SUMMARY OF THE INVENTION

The present invention aims to address the issue of deploying costly hardware by proposing a content protection layer with an easy distribution capability to clients.

The aim is achieved by an network device for descrambling an access controlled audio/video content stream, said network device being configured to be connected to a network router is characterized in that it comprises:
a memory to store a unique address UA specific to the network device,
a network input/output interface,
a descrambler to descramble the audio/video content stream,
a watermark engine configured to watermark the descrambled audio/video content stream according to the unique address UA, A further object of the invention is a method to access scrambled audio/video content stream via a IP network by using a multimedia reception device connected to a network router associated to a network device, said network device being identified by a unique address stored in a memory of said network device, the method comprising steps of:
selecting a scrambled audio/video content stream on a list of scrambled audio/video content displayed by the multimedia reception device, said audio/video content stream being made available, on the IP network by at least one content providers server,
notifying by the multimedia reception device the network device on the selected audio/video content stream,
connecting the network device to the content provider server to obtain the selected scrambled audio/video content stream,
securely connecting the network device to a conditional access system server for sending the unique address to said server,
obtaining an access right to the selected scrambled audio/video content stream,
descrambling by the network device, the scrambled audio/video content stream by using the obtained access right,
watermarking all or a part of the descrambled audio/video content stream in order to embed the unique address identifying the network device, so as to obtain a personalized descrambled audio/video content stream,
sending said personalized descrambled audio/video content stream to the multimedia reception device.

The network device preferably in form of a removable hardware dongle comprises an Ethernet connection allowing plugging it into an appropriate Ethernet connector of the router. The dongle is in charge of communicating with a server, requesting the content desired by the user, providing its unique address UA, receiving the protected content, removing the protection, adding the watermark and supplying the watermarked content to the multimedia reception device via the Ethernet network.

Although the dongle of the present invention has some features common to the system on chip of document U.S. Pat. No. 7,406,598, it is further adapted to solve the problem of live streaming of media content over Ethernet connection or IP port. Furthermore, the system on chip of document U.S. Pat. No. 7,406,598 is limited to be used for content distribution where external inputs and outputs are secured storage location.

BRIEF DESCRIPTION OF THE DRAWINGS

The invention will be better understood with the following detailed description, which refers to the attached figures given as non-limitative examples.

DETAILED DESCRIPTION OF THE INVENTION

Figure 1:
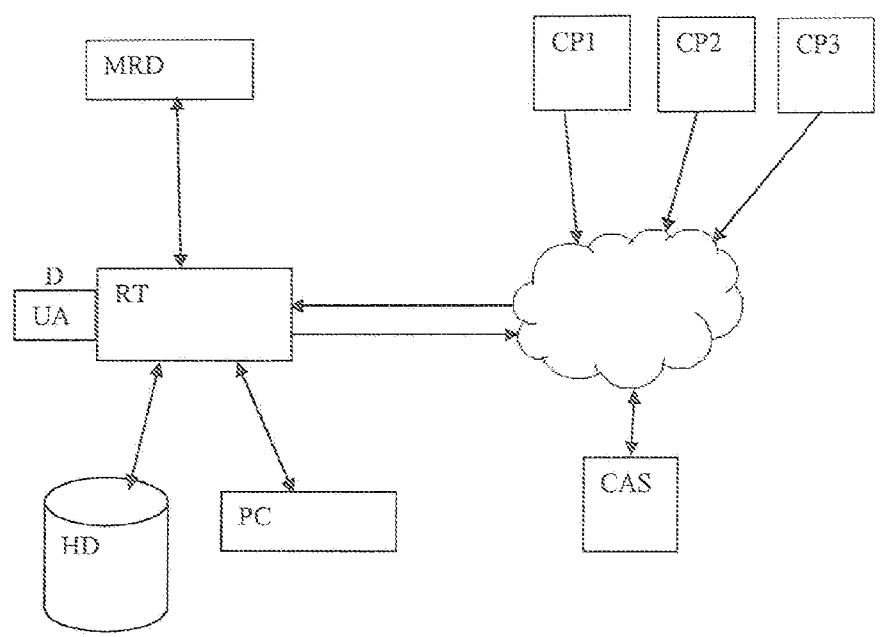
FIG. 1 shows a block diagram of a local mode to access a content stream by a multimedia reception device connected to a network router associated to a network device.

The network device D of the invention may be configured as a removable hardware dongle connected to one of the IP ports of a standard router RT which is an element of a user's network. The functions of the dongle may be summarized as follow:

providing a secure unique address UA,
receiving a protected content stream,
removing the protection of the content stream,
adding a watermark according to the unique address,
make available the watermarked content to a multimedia reception device The protection of the content stream can be removed according to different ways. A first way is to descramble the content. The key for descrambling the content can be requested once within a predetermined period (e.g. a day) or in relation to each content stream. To receive the proper descrambling key, the dongle D should present its unique address UA, which is verified in a database of a conditional access system sever CAS or other server where the dongle is registered along with user identification. If the unique address UA is considered as valid by the CAS server, the descrambling key is sent to the dongle D. According to an embodiment, this key is sent in clear or may be encrypted by a personal key of the dongle D. For that purpose, the database of the CAS server contains for each UA, a personal key of the dongle D.

According to a further embodiment, the content itself is encrypted by the personal key of the dongle D. In this case, the encrypted content is dedicated only to a given dongle D.

Another way to protect the content is the use of the method developed by Medialive disclosed in WO03/063445. The initial content is corrupted by removing some data at particular places and the removed data (which represent a few percentage of the content) forms complementary information. The corrupted content is sent to all users using unicast or multicast mode, and the complementary information, encrypted for a particular dongle, is sent upon request of the dongle.

While the protection layer is removed, the dongle D adds a watermark to identify the dongle D which has removed the protection. Common techniques can be used such as developed by Civolution according to WO01/28230. The dongle D provides an output that can be accessed by any device within the network. In case of connection to a router via a wireless protocol (Wireless Fidelity, WiFi) for example, a multimedia reception device MRD as a television set, receives the data packets of the content stream from the dongle D via the WiFi connection.

The multimedia reception device MRD may also comprise adaptive streaming feature as a feature of the dongle D (or the system): if the content is viewed on a low bandwidth network, the dongle D or the system will adapt the bandwidth of the streamed content by changing the resolution, the quality or the compression factor. The adaptive streaming may be performed according to following modes:

At the input of the dongle D, a high throughput of the content stream entering the dongle D is automatically reduced by means of intermediate buffering and using a handshake mechanism.

At the output of the dongle D the throughput, the resolution, the quality or the compression factor of the descrambled watermarked content stream are adapted to the network bandwidth performances.

In a transparent mode, the content streaming through the dongle D is controlled and adapted to the network capabilities from the content provider to the multimedia reception device MRD.

The dongle D may be configured to process several content streams in parallel. In this case, the dongle D can store several content descrambling keys at a time and is able to obtain two (or more) protected streams, remove by the descrambler the protection of the received streams, embed the watermark by the watermark engine and provide these descrambled watermarked streams to the multimedia reception device MRD connected to the network.

Some of the network devices comply with the standard Power over Ethernet (or PoE or IEEE 802.3af standard). The dongle will preferably be powered through PoE to avoid additional transformer. Another way to power and connect the dongle is through an Universal Serial Bus (USB) interface. In this case the host device (network router RT) is provided with a network connection and a specific software application producing a gateway between the USB interface and the network connection. In a further configuration, the dongle D, individually powered, may also use a wireless network connection such as WiFi or 3G/4G with the network router RT.

According to an embodiment, the dongle D may include an internal memory to store content or an external memory consisting of a memory card such as for example a MicroSD card or other standardized type of memory card. This configuration allows adding Personal Video Recorder (PVR) functionalities (recording, playing, pause, slow/fast forwarding and slow/fast rewinding) to the dongle D where stored content can be accessed randomly by a local or a remote multimedia reception device (MRD, RMRD).

The block diagram of FIG. 1, illustrates a first mode to access locally a content stream by a multimedia reception device MRD such as a television set or a personal computer PC connected to a network router RT associated to a network device or dongle D. The content stream is made available on the IP network by one or several content providers (CP1, CP2, CP3) distributing scrambled audio/video content streams. Content may also be stored on a local or remote hard disk HD in a scrambled form and made available on the network. A conditional access system server CAS includes a database storing user identification data along with the unique address UA of the network device D which identifies it on the network. This unique address UA stored in a memory of the network device D allows obtaining scrambled streams on the network only if the user benefits from the appropriate access rights.

A user selects a scrambled audio/video content stream on a list of scrambled audio/video content available on the network displayed via a user interface of the multimedia reception device MRD. According to a local mode represented by FIG. 1, the network device D finds a content provider server (CP1, CP2, CP3) and the conditional access system server CAS by using a standard Domain Name System (DNS) protocol and sends appropriate requests to obtain the selected stream and the corresponding access rights. The unique address UA of the dongle D allows obtaining the necessary access right from a conditional access server CAS of an operator providing access rights to scrambled content streams. The router RT is preferably configured for a dynamic IP address which changes a specific periods or at each session instead of a static IP address.

The connection of the network device (dongle D) to the conditional access system server CAS is made secure by creating an encrypted VPN (Virtual Private Network) tunnel. Each of the network router RT respectively the dongle D and the CAS server are authenticated mutually so that a global or unique key for descrambling a stream can be sent through the encrypted VPN tunnel from the CAS server to the network device D via the network router RT. The descrambling keys are generally sent in clear form in the encrypted VPN tunnel.

The access rights may be acquired by a user either by impulse purchase (IPPV) Impulse Purchase per View of one or a set of content or by a subscription to one or more sets or categories of content.

Thanks to the descrambler integrated in the dongle D, the received content is descrambled and watermarked by applying the unique address UA of the dongle D entirely or partially to save processing load and time. This watermarking prevents anonymous copies and distribution of the content to third parties over Internet for example. The content is thus personalized for as given network router RT acting as a source of content stream. The origin of a copy can thus be identified and the corresponding dongle D may be blacklisted or rejected from the network.

Figure 2:
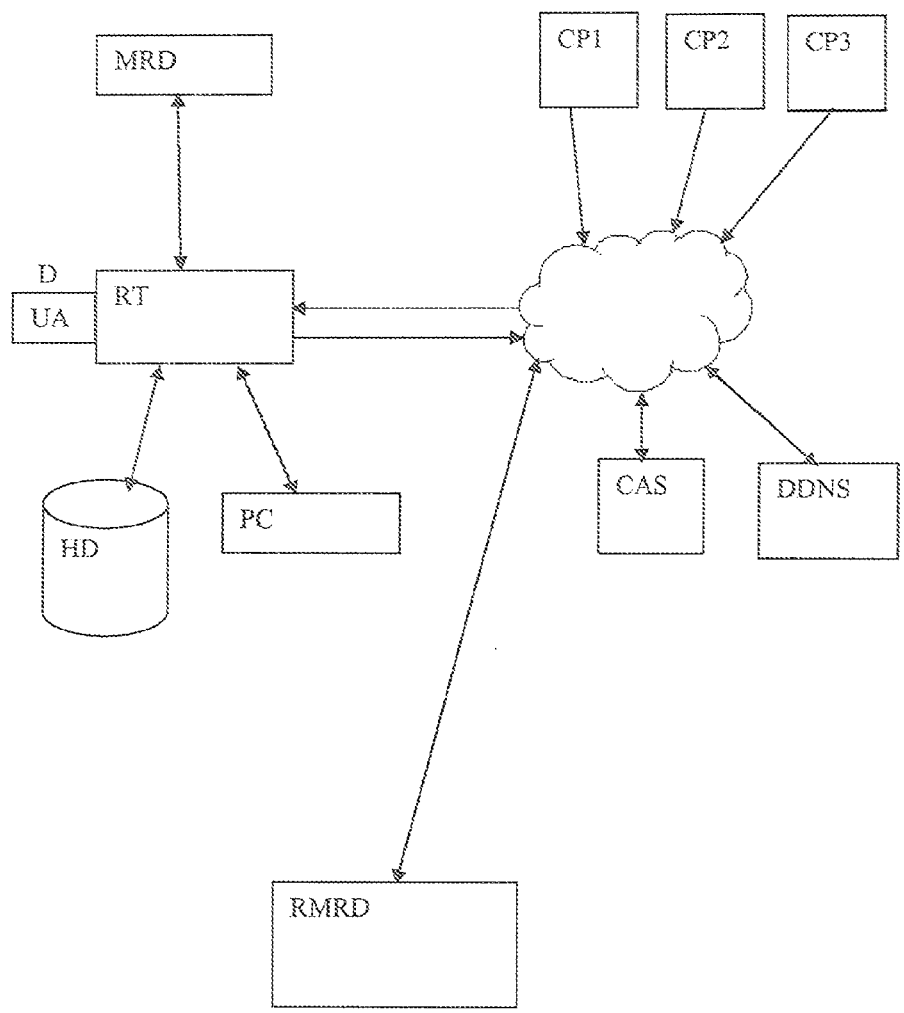
FIG. 2 shows a block diagram of a roaming mode to access a content stream by a multimedia reception device connected to a network router associated to a network device.

A second access mode illustrated by FIG. 2 may be performed remotely by a remote multimedia reception device RMRD such as a smart phone, a tablet PC, a personal computer etc. or any user unit able to connect to a public network, i.e. Internet. This mode is also called roaming mode where the user connects to scrambled content streams whatever the location of the remote multimedia reception device RMRD in relation with the network router RT.

A user who connects a device via a cable or wirelessly to Internet via an Internet Service Provider (ISP) will be allocated a numeric IP address by the ISP. This address may either be static, or dynamic, i.e. it changes from one session on the Internet to the next. If it is necessary to be able to access a remote computer or other network device from another location, a static numeric address is inconvenient to remember; an address which changes unpredictably makes connection impossible.

In this case, an IP address of the network router RT is determined by using a service called Dynamic DNS (Domain Name System) service (DDNS). A DDNS provider allocates a static hostname to the user; whenever the user is allocated a new IP address this is communicated to the DDNS provider by software (implementing RFC 2136 protocol or other protocols) running on the network router RT equipped with the dongle D at that address. The DDNS provider distributes the association between the hostname and the address to an Internet DNS server so that DNS queries are resolved. The final result is that a roaming user may communicate with his network router at home, for example through a website "username.ddnsservice.org" instead of an unknown varying IP address. The host name is resolved to the current address of the network router RT at home with a DNS query transparent to the user. The communication between the dongle D via the network router RT and the DDNS provider is preferably secured by using protocols such as Transport Layer Security (TLS) or Secure Sockets Layer (SSL). The remote multimedia reception device RMRD uses the standard DNS servers from the internet Service Provider (ISP) currently used at the remote location to resolve "username.ddnsservice.org" domain name. In order to minimize setting up of the network router RT by the user, the network device or dongle D updates automatically the IP address on a server of the DDNS provider.

Two prerequisites are needed for the network router RT for working with remote multimedia reception device RMRD: The IP address of the network router RT is regularly updated by a DDNS service to which it is linked. The network router RT is configured for port forwarding which points to the network device D when connection requests to the content provider server (CP1, CP2, CP3) are carried out by remote multimedia reception devices RMRD. The port forwarding may be performed either through a static configuration or by using a protocol such as UPnP (Universal Plug and Play) where the network device tells the network router RT to open a port and to forward it to its internal IP address.

The remote multimedia reception device RMRD finds the network device D by using the DNS protocol and carries out steps of selecting a scrambled audio/video content stream on a list of scrambled audio/video content. The list is retrieved either from the network device D or directly from a content provider server (CP1, CP2, CP3) of the network. The network device D receives the list from the content provider server.

notifying by the remote multimedia reception device RMRD the network device D on the selected audio/video content stream, connecting the network device D to the content provider server (CP1, CP2, CP3) to obtain the selected scrambled audio/video content stream, securely connecting the network device D to a conditional access system server CAS for sending the unique address UA to said server, obtaining an access right to the selected scrambled audio/video content stream, descrambling by the network device D, the scrambled audio/video content stream by using the obtained access right, watermarking ail or a part of the descrambled audio/video content stream in order to embed the unique address UA identifying the network device D, so as to obtain a personalized descrambled audio/video content stream, sending said personalized descrambled audio/video content stream to the remote multimedia reception device RMRD.

According to an embodiment configured to improve security, the network device D and the remote multimedia reception device RMRD create an encrypted VPN tunnel to transfer the personalized descrambled audio/video content stream. This configuration may allow proving that leaked content stream was not illegally captured from the network. In the local access mode, the encrypted VPN tunnel may be not necessary since the local network is less exposed to eavesdropping than the global network.

When the remote multimedia reception device RMRD is connected to the network router RT, respectively to the network device D, the obtained IP address together with the unique address UA of the network device D is transmitted by said network device D to the server of the conditional access system CAS after a user login with a user name and password.

Once the connection with the network router RT or the network device D is set up with the appropriate access rights and input port for receiving the content stream, the remote multimedia reception device RMRD receives the descrambled and watermarked audio/video content stream in a similar way than the multimedia reception device MRD in the local mode.

As the set composed by the network router RT with the dongle D plugged in a network port plays a role of a media player providing privatized content, a remote access to other devices connected to the network router is also possible. For example, content stored on a hard disk HD, or in a personal computer PC is thus accessible whatever the location of the remote multimedia reception device RMRD.

The audio/video content stream is transmitted to the multimedia reception device MRD or to the remote multimedia reception device RMRD via the network by using preferably a protocol named Real Time Streaming Protocol (RTSP) or Secure Real Time Streaming Protocol (RTSPS), which is a network control protocol designed for use in entertainment and communications systems to control streaming media servers, i.e. the network router with the dongle of the present invention. This protocol is used for establishing and controlling media sessions between end points. A client of a media server i.e. the remote multimedia reception device RMRD is configured to issue commands as a video player/recorder, such as play, pause, fast forward, rewind, to facilitate real-time control of playback of the content of the server, i.e. the network router RT with the dongle D. For example media players like Zattoo, VLC, Real Player, Flash Player, Windows media players, etc. use the RTSP protocol.

The invention claimed is:

1. A network device for descrambling an access controlled audio/video content stream, said network device being configured to be connected to a network router said network device comprising:
a memory to store a unique address specific to the network device;
a network input/output interface;
a descrambler to descramble the audio/video content stream; and
a watermark engine configured to watermark all or part of the descrambled audio/video content stream according to the unique address to embed the unique address identifying the network device, so as to obtain a personalized descrambled audio/video content stream designed to be sent to a multimedia reception device;
wherein the network device is configured to process a plurality of content streams in parallel by obtaining two or more content streams intended to the watermark engine and descrambling the obtained two or more content streams using respective content descrambling keys stored on the device before receipt of the streams; and
wherein the audio/video content stream is descrambled by using a descrambling key securely received by said network device from a conditional access system server where the network device is recorded with a user identification and the unique address.

2. The network device according to claim 1, wherein the network device is configured as a removable hardware dongle adapted to be connected to an Ethernet port of the network router which is an element of a user network.

3. The network device according to claim 1, wherein the connection with the network router complies with a Power over Ethernet standard or the IEEE 802.3af standard.

4. The network device according to claim 1, wherein the connection with the network router is made through a Universal Serial Bus interface.

5. The network device according to claim 1, wherein the network device is configured for an adaptive streaming feature in which the bandwidth of the content stream is adapted by changing resolution, quality or compression factor.

6. The network device according to claim 1, further comprising an internal or external memory to store content and functionalities of a Personal Video Recorder.

7. A method to access scrambled audio/video content stream via an Internet Protocol (IP) network by using a multimedia reception device connected to a network router associated to a network device, said network device being identified by a unique address stored in a memory of said network device, said network device comprising a network input/output interface, a descrambler to descramble the audio/video content stream, and a watermark engine configured to watermark the descrambled audio/video content stream according to the unique address, the method comprising:
selecting a scrambled audio/video content stream from a list of scrambled audio/video content displayed by the multimedia reception device, said audio/video content stream being made available on the IP network by at least one content provider server;
notifying by the multimedia reception device the network device of the selected audio/video content stream;
connecting the network device to the content provider server to obtain the selected scrambled audio/video content stream;
securely connecting the network device to a conditional access system server and sending the unique address to said server;
obtaining an access right to the selected scrambled audio/video content stream;
descrambling by the network device, the scrambled audio/video content stream using the obtained access right;
watermarking all or a part of the descrambled audio/video content stream in order to embed the unique address identifying the network device, so as to obtain a personalized descrambled audio/video content stream; and
sending said personalized descrambled audio/video content stream to the multimedia reception device,
wherein the network device is configured to process a plurality of content streams in parallel by obtaining two or more content streams intended to the watermark engine and descrambling the obtained two or more content streams using respective content descrambling keys stored on the device before receipt of the streams; and
wherein the audio/video content stream is descrambled by using a descrambling key securely received by the network device from the conditional access system server where the network device is recorded with a user identification and the unique address.

8. The method according to claim 7, wherein the multimedia reception device includes a remote multimedia reception device connected to the network router and the network device in a roaming mode via Internet, said network router having an IP address linked to a Dynamic Domain Name System service is configured for port forwarding which points to the network device when connection requests to the content provider server are carried out by the remote multimedia reception device which finds the network device by using the Domain Name Service protocol.

9. The method according to claim 8, wherein the network device and the remote multimedia reception device create an encrypted Virtual Private Network tunnel to transfer the personalized descrambled audio/video content stream.

10. The method according to claim 8, wherein the remote multimedia reception device is selected from the group consisting of a smart phone, a personal computer (PC), a tablet PC or any user unit able to connect to the Internet.

11. The method according to claim 7, wherein the audio/video content stream is transmitted via the network to the multimedia reception device or to the remote multimedia reception device by using a Real Time Streaming Protocol or a Secure Real Time Streaming Protocol.

12. The method according to claim 7, wherein the connection of the network device to the conditional access system server is made secure by creating an encrypted Virtual Private Network tunnel, the network device and the conditional access system server being authenticated mutually allowing sending by said conditional access system server a unique key for descrambling, by the network device, the scrambled audio/video content stream.

* * * * *